US012505968B2

(12) United States Patent
Murakoshi

(10) Patent No.: US 12,505,968 B2
(45) Date of Patent: Dec. 23, 2025

(54) RELAY WITH AN ELECTROMAGNET AND MOVEABLE CONTACT THAT OPERATES CORRESPONDING TO ACTIVATION OF THE ELECTROMAGNET

(71) Applicant: FCL Components Limited, Tokyo (JP)

(72) Inventor: Takuji Murakoshi, Tokyo (JP)

(73) Assignee: FCL Components Limited, Tokyo (JP)

( * ) Notice: Subject to any disclaimer, the term of this patent is extended or adjusted under 35 U.S.C. 154(b) by 69 days.

(21) Appl. No.: 17/812,793

(22) Filed: Jul. 15, 2022

(65) Prior Publication Data

US 2023/0019139 A1 Jan. 19, 2023

(30) Foreign Application Priority Data

Jul. 16, 2021 (JP) ................................ 2021-118161

(51) Int. Cl.
*H01H 50/58* (2006.01)
*H01H 9/44* (2006.01)
(Continued)

(52) U.S. Cl.
CPC ............ *H01H 50/58* (2013.01); *H01H 9/443* (2013.01); *H01H 50/041* (2013.01);
(Continued)

(58) Field of Classification Search
CPC ...... H01H 50/58; H01H 9/443; H01H 50/041; H01H 50/14; H01H 50/18; H01H 50/38; H01H 50/646; H01H 50/023; H01H 50/045; H01H 50/546; H01H 50/26; H01H 50/54; H01H 50/30
(Continued)

(56) References Cited

U.S. PATENT DOCUMENTS 3,355,629 A 11/1967 Schapira
3,434,081 A 3/1969 Foster
(Continued)

FOREIGN PATENT DOCUMENTS

AT 410855 B 8/2003
EP 2763153 A1 8/2014
(Continued)

OTHER PUBLICATIONS

Extended Search Report from counterpart European Application No. 23150729.4 dated May 3, 2023, 6 pp.
(Continued)

*Primary Examiner* — Shawki S Ismail
*Assistant Examiner* — Lisa N Homza
(74) *Attorney, Agent, or Firm* — Shumaker & Sieffert, P.A.

(57) ABSTRACT

A base of a relay has a leg extending in a contact/separation direction between contacts, and the leg is configured to come into contact with a yoke when the base is incorporated into a case. The leg is spaced away from an upper part of an armature by a distance. This distance is determined so that an upper surface of the armature does not come into contact with the leg in a normal operation of the armature, but the upper surface of the armature comes into contact with a lower surface of the leg when the armature jumps up beyond a movable range thereof due to, for example, a strong impact applied to a vehicle on which the relay is mounted.

5 Claims, 11 Drawing Sheets

(51) Int. Cl.

| | |
|---|---|
| ***H01H 50/04*** | (2006.01) |
| ***H01H 50/14*** | (2006.01) |
| ***H01H 50/18*** | (2006.01) |
| ***H01H 50/38*** | (2006.01) |

(52) U.S. Cl.
CPC ............ *H01H 50/14* (2013.01); *H01H 50/18* (2013.01); *H01H 50/38* (2013.01)

(58) Field of Classification Search
USPC .......................................................... 335/175
See application file for complete search history.

(56) References Cited

U.S. PATENT DOCUMENTS

| | | | |
|---|---|---|---|
| 3,824,329 A | 7/1974 | Schantz | |
| 3,848,205 A | 11/1974 | Schantz et al. | |
| 3,878,489 A | 4/1975 | Rothweiler | |
| 3,958,094 A | 5/1976 | Schantz et al. | |
| 3,964,005 A | 6/1976 | Schantz | |
| 8,138,872 B2 | 3/2012 | Yoshihara et al. | |
| 12,243,701 B2 | 3/2025 | Murakoshi | |
| 2009/0322455 A1* | 12/2009 | Yoshihara | H01H 51/2209 335/189 |
| 2012/0081199 A1 | 4/2012 | Hao | |
| 2014/0232489 A1* | 8/2014 | Kubono | H01H 50/546 335/83 |
| 2015/0054605 A1 | 2/2015 | Kubono et al. | |
| 2015/0187527 A1* | 7/2015 | Kubono | H01H 50/042 335/189 |
| 2016/0372286 A1 | 12/2016 | Kubono et al. | |
| 2017/0345594 A1 | 11/2017 | Shumaker | |

FOREIGN PATENT DOCUMENTS

| | | |
|---|---|---|
| JP | H0520732 U | 3/1993 |
| JP | H0680239 U | 11/1994 |
| JP | 1995(H07)-230839 A | 8/1995 |
| JP | 2006-004665 A | 1/2006 |
| JP | 2017-010719 A | 1/2017 |
| JP | 2021-039829 A | 3/2021 |
| KR | 20200025808 A | 3/2020 |
| WO | 2019031229 A1 | 2/2019 |

OTHER PUBLICATIONS

Extended Search Report from counterpart European Application No. 22181364.5 dated Feb. 21, 2023, 6 pp.
Office Action from U.S. Appl. No. 18/443,923 dated Sep. 23, 2024, 6 pp.
Extended Search Report from counterpart European Application No. 24191175.9 dated Sep. 26, 2024, 6 pp.
Office Action from U.S. Appl. No. 18/443,983 dated Sep. 10, 2024, 7 pp.
Notice of Allowance from U.S. Appl. No. 18/443,923 dated Dec. 20, 2024, 7 pp.
Notice of Allowance from U.S. Appl. No. 18/443,983 dated Feb. 5, 2025, 7 pp.
Notification of Reason for Refusal, and translation thereof, from counterpart Japanese Application No. 2021-118161 dated Jan. 28, 2025, 6 pp.
Response to Office Action dated Sep. 10, 2024 from U.S. Appl. No. 18/443,983, filed Dec. 10, 2024, 6 pp.
Response to Office Action dated Sep. 23, 2024 from U.S. Appl. No. 18/443,923, filed Nov. 22, 2024, 5 pp.
Corrected Notice of Allowance from U.S. Appl. No. 18/443,983 dated Apr. 4, 2025, 2 pp.
Response to Notification of Reason for Refusal, and translation thereof, dated Mar. 27, 2025, from counterpart Japanese Application No. 2021-118161 filed Jan. 28, 2025, 11 pp.

* cited by examiner

B-B′ SECTION

RELAY WITH AN ELECTROMAGNET AND MOVEABLE CONTACT THAT OPERATES CORRESPONDING TO ACTIVATION OF THE ELECTROMAGNET

CROSS-REFERENCE TO RELATED APPLICATIONS

This application is based upon and claims the benefit of priority of the prior Japanese Patent Application No. 2021-118161 filed on Jul. 16, 2021, the entire contents of which are incorporated herein by reference.

TECHNICAL FIELD

A certain aspect of the embodiments is related to a relay.

BACKGROUND

In a relay (electromagnetic relay), a current flows through a coil to open and close contacts. There is a hinge-shaped relay which has a yoke connected to an iron core and an armature movable relative to the yoke.

In recent years, relays are increasingly used for applications, such as mounting on electric vehicles, in which the relay is susceptible to shock and vibration. In order to prevent the amateur from being displaced relative to the yoke when a large impact or vibration is applied to the relay, a technique to make the armature rotatable relative to the yoke is well known, in which one of the yoke or the amateur is provided with a shaft, and the other is provided with a bearing which rotatably receives the shaft.

A relay is well known in which a groove for holding a contact is formed on the lateral side of a substrate, the contact is inserted into the groove so as to be engaged and held by the groove, and then the periphery of an extended portion of an external terminal is sealed with an adhesive. Further, a terminal block is well known in which a groove opened in a body for attaching a component is provided, a terminal, etc., is inserted from the opening and attached to the body, and a lid plate covering the opening is attached to the body.

RELATED ART

[Patent Literature 1] JP 2017-010719 A

[Patent Literature 2] JP 2021-039829 A

[Patent Literature 3] JP 2006-004665 A

[Patent Literature 4] JP H07-230839 A

SUMMARY

One aspect of the present disclosure is a relay comprising: an electromagnet having a yoke; a movable contact part having an armature configured to operate corresponding to an activation of the electromagnet, a movable spring attached to the armature, and a movable contact attached to the movable spring; and a fixed contact part having a base to which a fixed contact opposed to the movable contact is attached, wherein the base has a leg extending in a contact/separation direction between the fixed contact and the movable contact, the leg contacts the yoke, and the leg is spaced away from an upper part of the armature.

DESCRIPTION OF EMBODIMENTS

In many relays, a leaf spring and/or a coil spring are used to generate an appropriate contact force and a disengagement force for opening and closing contacts. When such a relay is used for an application in which the relay is susceptible to impact or vibration, the spring may be plastically deformed by the impact, and an appropriate contact force or an appropriate opening force may not be obtained. On the other hand, if a reinforcing member, etc., for withstanding an impact is separately provided, the relay assembly work becomes complicated and may lead to an increase in cost.

Hereinafter, a description will be given of the present embodiment of the present invention with reference to the drawings.

Figure 1:
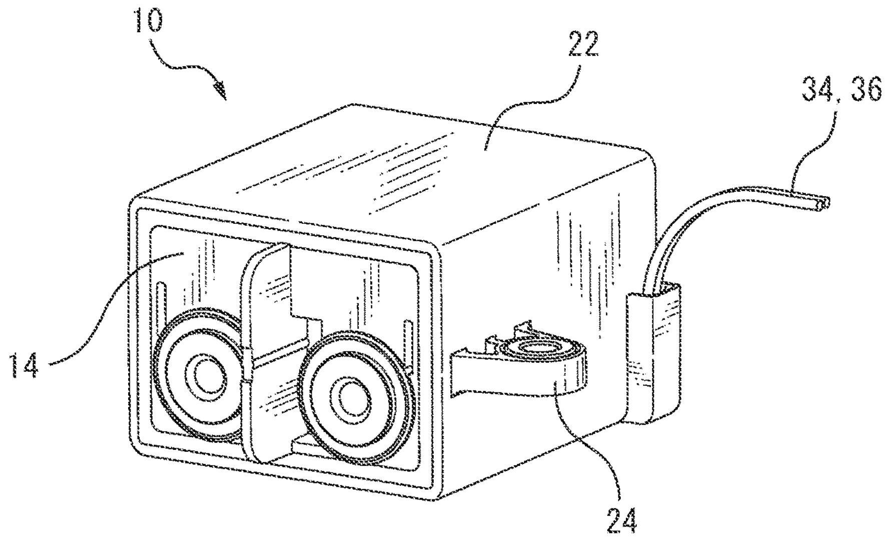
FIG. 1 is an assembling view of a relay according to an embodiment.
Figure 2:
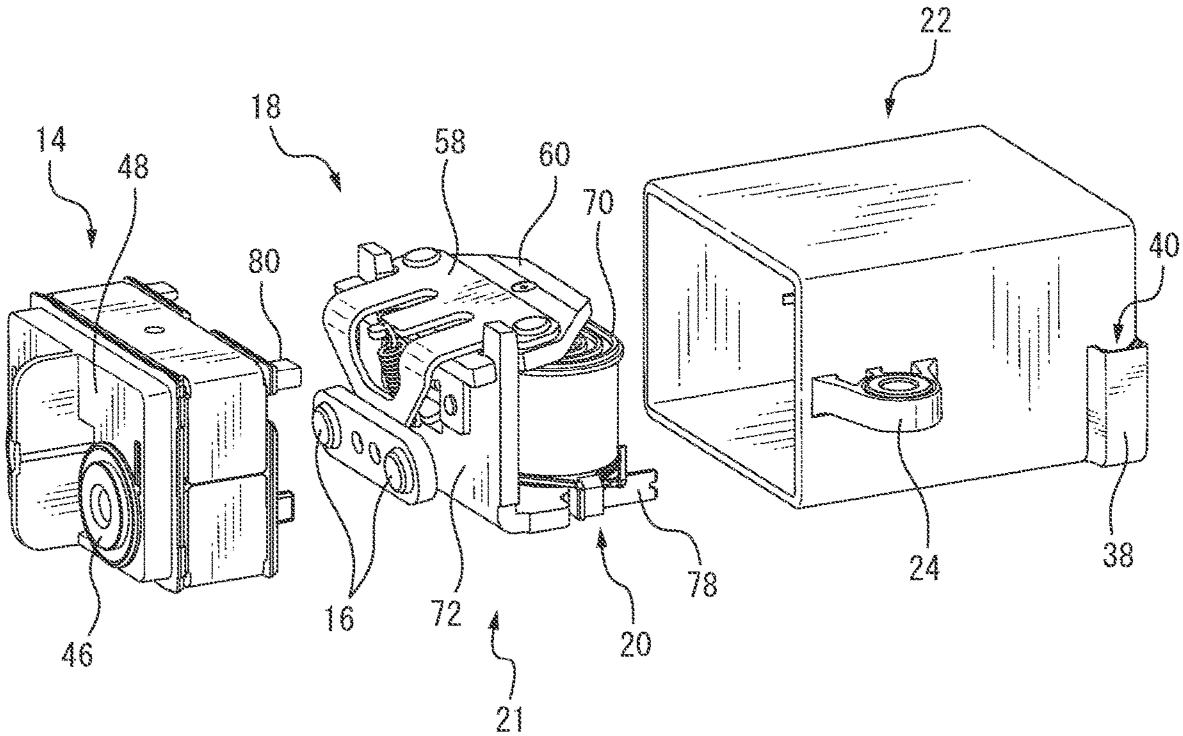
FIG. 2 is an exploded perspective view of the relay.

FIGS. 1 and 2 are assembling and exploded perspective views of a relay 10 according to an embodiment, respectively. For example, the relay 10 is a relay for in-vehicle electrical equipment used in an electric vehicle. The relay 10 is a hinge type relay including a fixed contact part 14 having a fixed contact 12 (FIG. 8), a movable contact part 18 having a movable contact 16, an electromagnet 20 configured to displace the movable contact 16 relative to the fixed contact 12 so that the movable contact 16 can come into contact or move away from the fixed contact 12, and a case 22 configured to contain the movable contact part 18 and the electromagnet 20. The relay 10 is mounted on a printed circuit board (not shown), etc., using a metal collar 24 attached to the outside of the case 22 by caulking, etc. The fixed contact portion 14 and the movable contact portion 18 are collectively referred to as a "contact part".

As shown in FIG. 2, the movable contact part 18 and the electromagnet 20 (collectively referred to as a "main body 21") may be moved relative to the case 22 along a contact/separation direction (a left-right direction in FIG. 2) between the fixed contact 12 and the movable contact 16, whereby the main body 21 is inserted and incorporated into the case 22. The case 22 can have a structure which opens only in the contact/separation direction, and it is not necessary to combine two parts divided in the vertical direction, for example. The fixed contact part 14 includes a base 48 and the fixed contact 12 provided on the base 48. By inserting the fixed contact part 14 into the case 22, a back surface of the fixed contact part 14 constitutes a lid of the relay 10. The relay 10 is sealed by filling a boundary between the fixed contact part 14 and the case 22 with a resin or an adhesive. The case 22 can be manufactured, for example, from resin molding. By forming the case 22 as described above, the number of components can be reduced and the manufacturing cost can be reduced.

Figure 3:
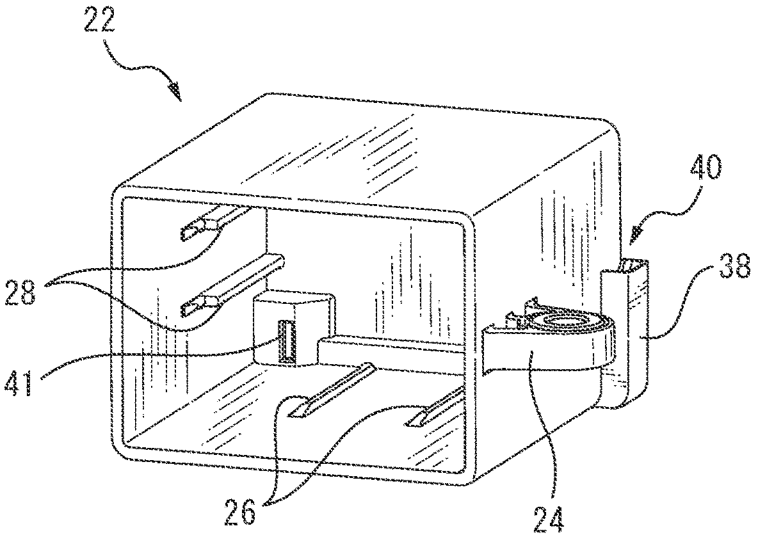
FIG. 3 is a perspective view of a case.
Figure 4:
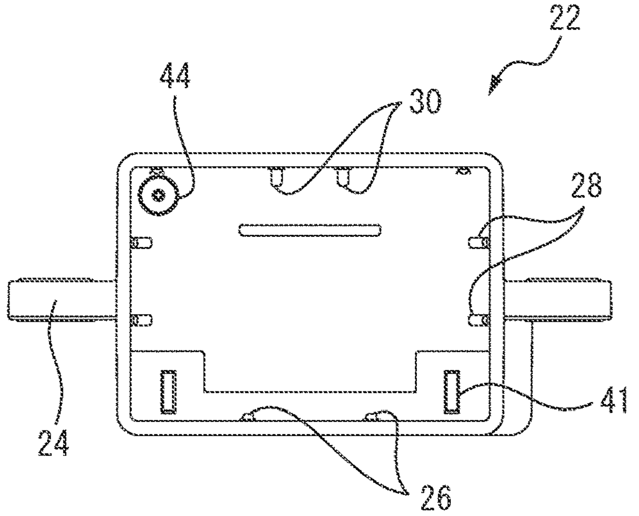
FIG. 4 is a front view of the case.

FIGS. 3 and 4 are perspective and front views of the inside of the case 22, respectively. The case 22 has ribs 26 and 28 configured to guide and locate the main body 21 at a predetermined position in the case 22. Each rib extends in the contact/separation direction of the contacts, and also in the mounting direction of the main body 21 to the case 22.

Figure 5:
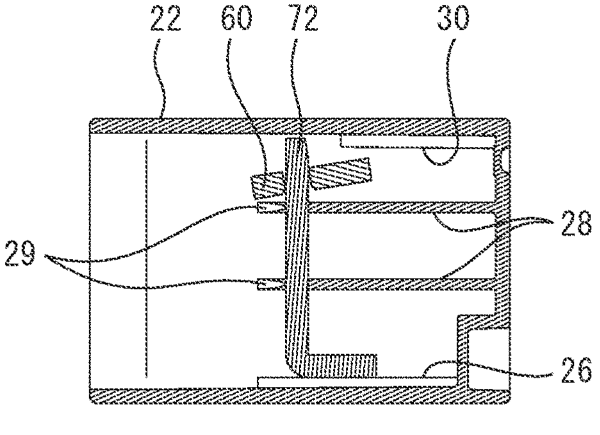
FIG. 5 shows a positional relationship between a rib, a yoke and an armature.

FIG. 5 is a cross-sectional view showing a positional relationship between an armature 60, a yoke 72 and each rib when the electromagnet 20 is positioned in the case 22. The rib 26 formed on an inner bottom surface of the case 22 contacts a lower surface of the yoke 72 to support the movable contact part 18, and contributes to the vertical positioning of the movable contact part 18. The rib 28 formed on an inner side surface of the case 22 has a surface 29 inclined in the insertion direction of the main body 21. The surface 29 functions as a guide in the width direction of the yoke 72 when the main body 21 is inserted into the case 22. The rib 28 contacts the side surface of the yoke 72 after the main body 21 is inserted, and contributes to the positioning of the electromagnet 20 relative to the case 22 in the width direction.

A rib 30 formed on an upper surface of the case 22 is arranged spaced away from the armature 60 in the vertical direction, so that the rib does not come into contact with the armature 60 in normal operation. Further, even if the armature 60 jumps up beyond the movable range when the vehicle on which the relay 10 is mounted receives a strong impact, the movement of the armature 60 is limited by the rib 30, whereby a large force is prevented from being applied to the contact and/or a return spring described later. By providing the rib 30, damage to each part and/or plastic deformation of the spring can be avoided.

Figure 6:
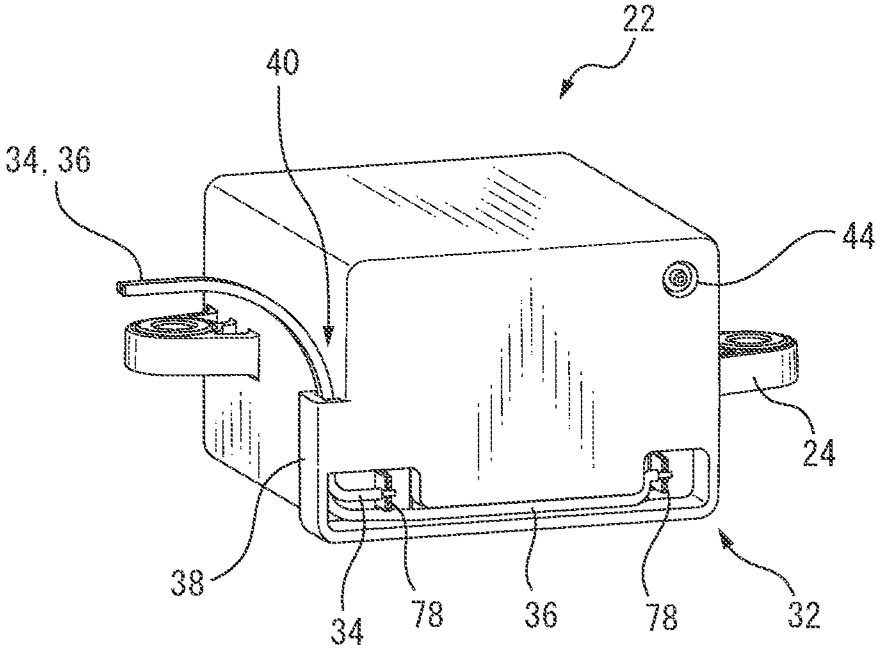
FIG. 6 is a back view of the case.
Figure 9:
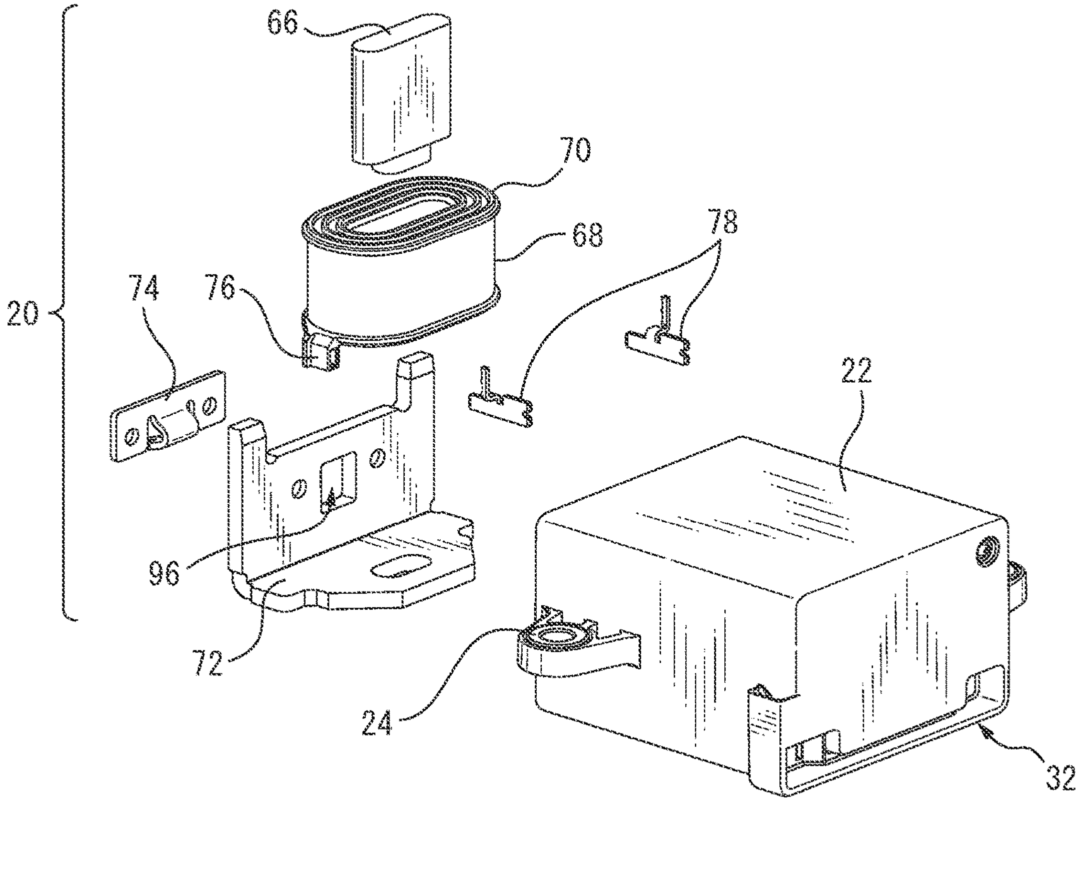
FIG. 9 is an exploded perspective view of an electromagnet.

FIG. 6 shows the back side of the case 22 opposite to an opening into which the main body 21 is inserted. As shown in FIGS. 2 and 9, the electromagnet 20 has two coil terminals 78 for supplying power to a coil 68. The coil terminals 78 are inserted into an opening 41 inside the case 22, and are exposed to the outside of the case 22 through an opening 32 formed on the back surface of the case 22. The opening 32 has a space for routing electric wires 34 and 36 respectively connected to the two coil terminals 78. After being introduced into a pocket 38 formed on the outer side of the case 22, the electric wires 34 and 36 are drawn out from an opening 40 above the pocket 38, and are electrically connected to a printed circuit board, etc., on which the relay 10 is mounted.

Figure 7:
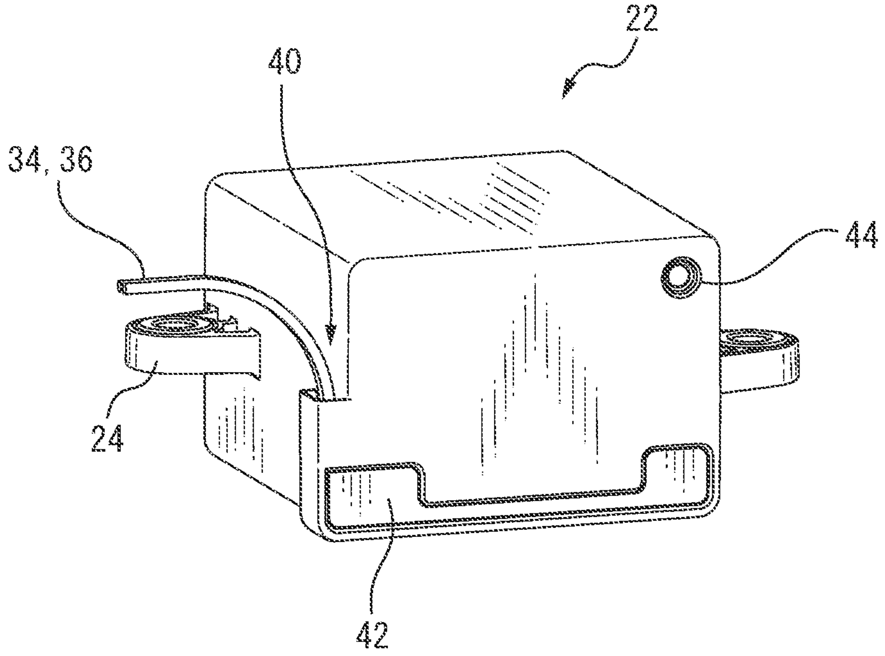
FIG. 7 shows a state in which an opening is occluded by resin.

FIG. 7 shows a state in which the electric wires 34 and 36 are drawn out from the opening 40 and then the opening 32 is filled with a resin or an adhesive 42 and sealed. As shown in FIG. 7, the electric wires 34, 36 or related members do not protrude from the back surface of the case 22, and the size of the relay in the contact/separation direction of the contacts can be reduced. It is preferable that the case 22 be provided with an air hole 44 in order to discharge the air expanded inside the case 22 when a thermosetting resin or adhesive is used. It is preferable that the air hole 44 be sealed with a resin, etc., after the opening 32 is sealed.

Figure 8:
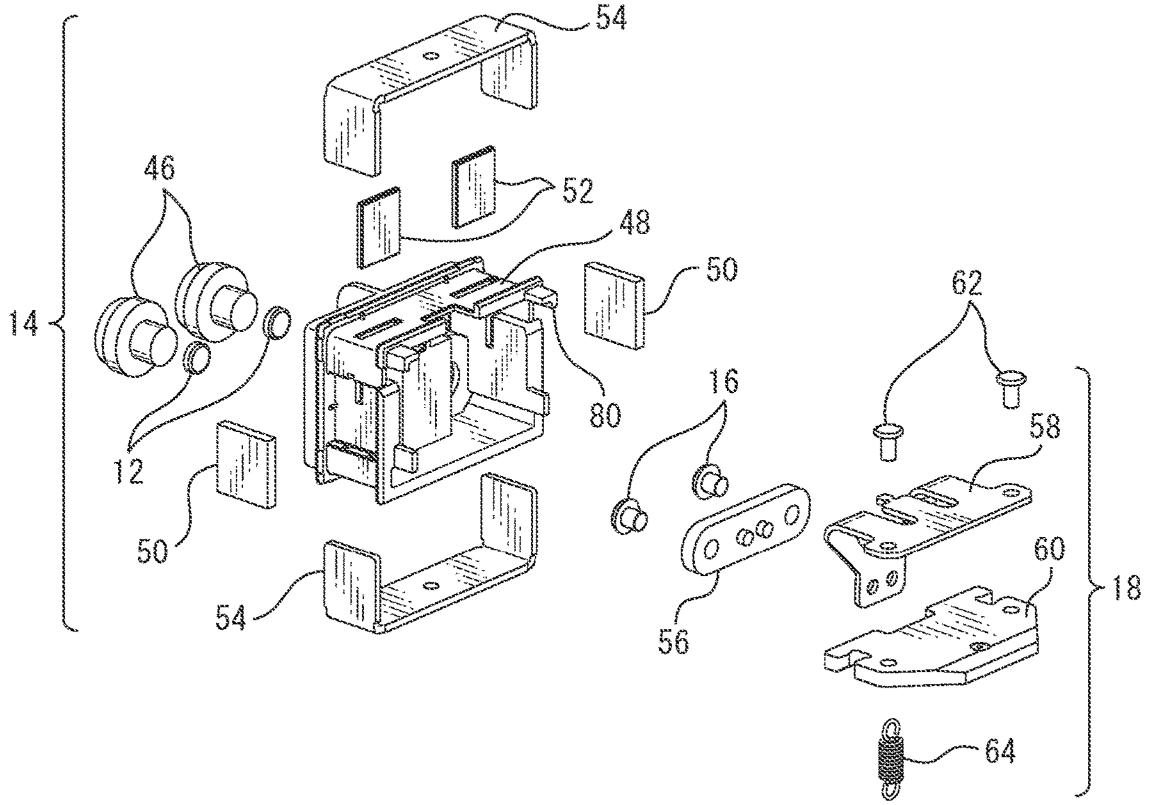
FIG. 8 is an exploded perspective view of a contact part.

FIG. 8 is an exploded perspective view of the contact part. The fixed contact part 14 has at least one (two in FIG. 8) fixed terminals 46, each provided with a fixed contact 12, and a frame-shaped or box-shaped base 48 to which the fixed terminal 46 is attached. A resin or an adhesive is filled between the fixed terminal 46 and the base 48 to seal a gap therebetween. The base 48 is manufactured, for example, by resin molding. A permanent magnet 50 and a permanent magnet yoke 54 are attached to the outer surface of the base 48, and an arc-extinguishing plate 52 for extinguishing an arc is inserted into the base 48, which will be described later.

The movable contact part 18 has a conductive plate 56 to which the movable contact 16 is attached by caulking, etc., a movable spring 58 to which the conductive plate 56 is attached, and the armature 60 to which the movable spring 58 is attached by a rivet 62, etc.

FIG. 9 is an exploded perspective view of the electromagnet 20. The electromagnet 20 has a bobbin 70, an iron core 66 positioned in the bobbin 70, a coil 68 wound around the bobbin 70, a substantially L-shaped yoke 72 to which a lower end of the iron core 66 is connected, and a post 74 attached to the yoke 72. The bobbin 70 has a terminal port 76 into which the coil terminal 78 is inserted, and a current flows through the coil 68 via the electric wires 34, 36 and the coil terminals 78. The armature 60 is swingably supported relative to the yoke 72. As will be described later, the movable spring 58 and the post 74 are connected via the return spring 64 so as to be elastically displaceable relative to each other.

Figure 10:
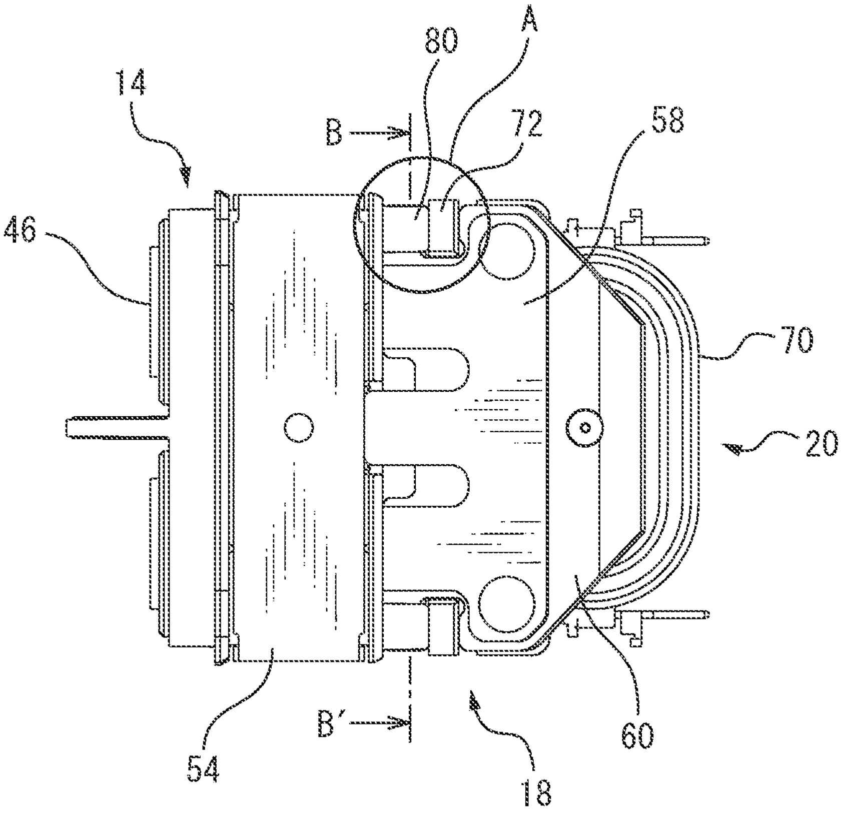
FIG. 10 is a top view of the contact part.
Figure 11:
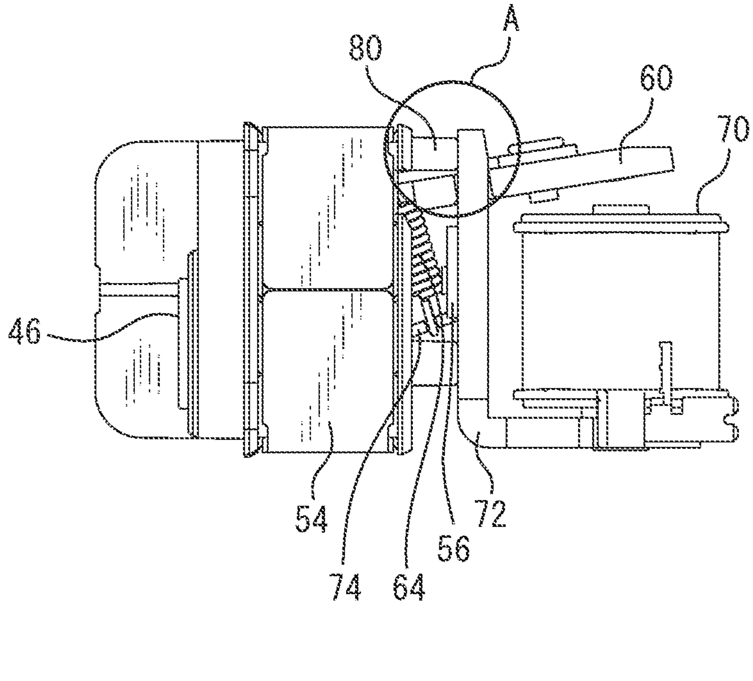
FIG. 11 is a side view of the contact part.
Figure 12:
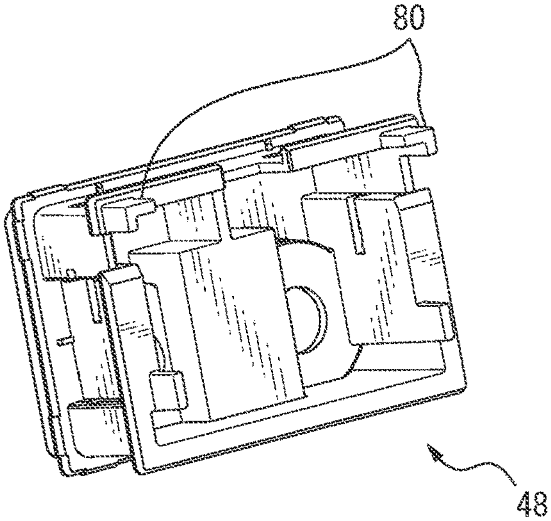
FIG. 12 is a perspective view of a case.
Figure 13:
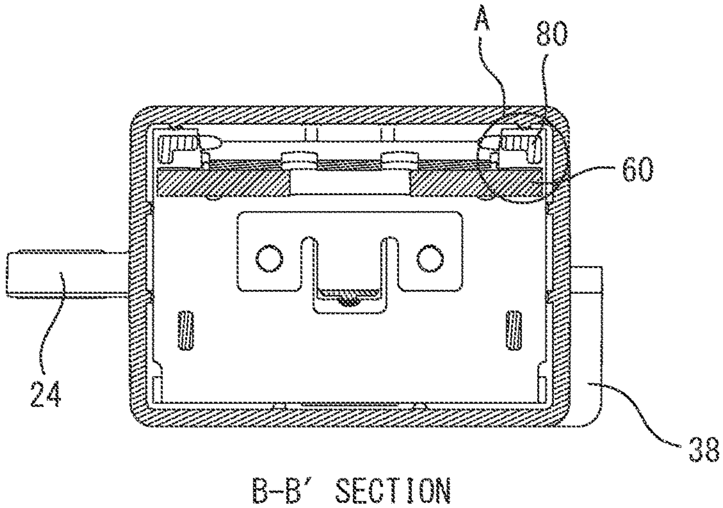
FIG. 13 is a cross-sectional view along a B-B' line.

FIGS. 10 and 11 are a top view and a side view of the contact part, respectively, and FIG. 12 is a perspective view of the base 48. The base 48 has a leg 80 extending in the mounting direction of the main body to the case 22. FIG. 13 is a cross-sectional view along a B-B' line of FIG. 10. As shown in a part "A" of FIGS. 10 and 11, an end surface of the leg 80 is configured to come into contact with the yoke 72 when the base 48 is incorporated into the case 22. Therefore, the positional relationship of the contacts between the fixed contact part 14 and the electromagnet 20 in the contact/separation direction is uniquely determined, and thus each component in the case 22 can be accurately positioned.

As shown in FIG. 13, the leg 80 is positioned above the armature 60 so as to be separated from the armature 60 by a certain distance. This distance is determined so that the upper surface of the armature 60 does not come into contact with the lower surface of the leg 80 in the normal operation of the armature 60, but the upper surface of the armature 60 comes into contact with the lower surface of the leg 80 when the armature 60 jumps up beyond the movable range thereof due to, for example, a strong impact applied to the vehicle on which the relay 10 is mounted. Since a conventional relay does not include a member which suppresses a large displacement of the armature 60 due to the lifting thereof, etc., a large force may be applied to the return spring 64 in the extending direction thereof due to the displacement of the armature 60, whereby the return spring 64 may be plastically deformed. In the embodiment, by virtue of the leg 80, the movement of the armature 60 beyond the movable range is limited, the force applied to the contacts and the return spring 64 is reduced, and the plastic deformation of the return spring 64 is also prevented. The leg 80 not only improves the positioning accuracy between the fixed contact part 14 and the electromagnet 20, but also prevents damage and plastic deformation of each component due to the impact, etc. The leg 80 can be integrally formed with the base 48 by resin molding, etc., and thus the number of components does not increase.

Figure 14:
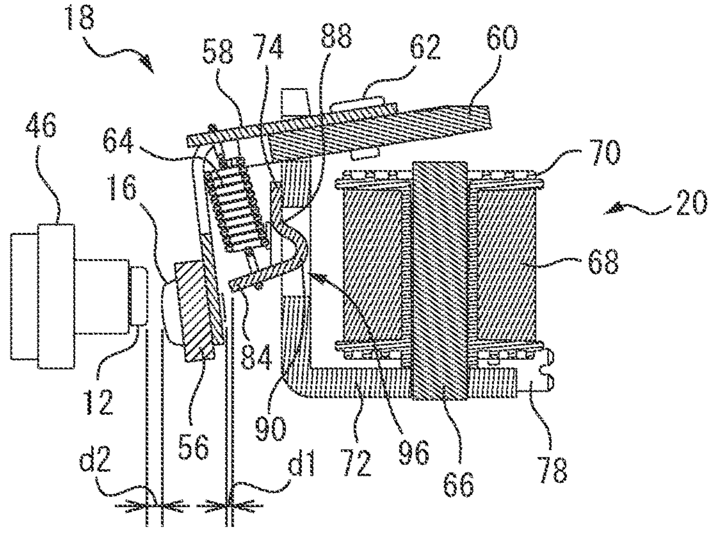
FIG. 14 is a side sectional view of the movable contact part and the electromagnet when the contacts are opened.
Figure 15:
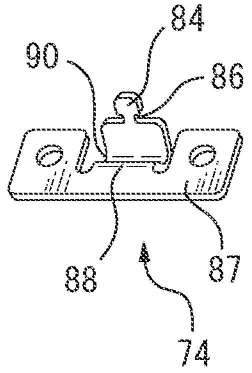
FIG. 15 is a perspective view of a post.
Figure 16:
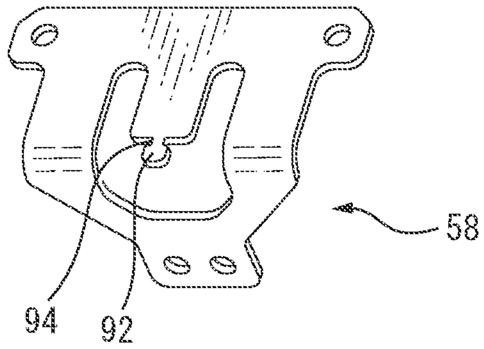
FIG. 16 is a perspective view of a movable spring.
Figure 17:
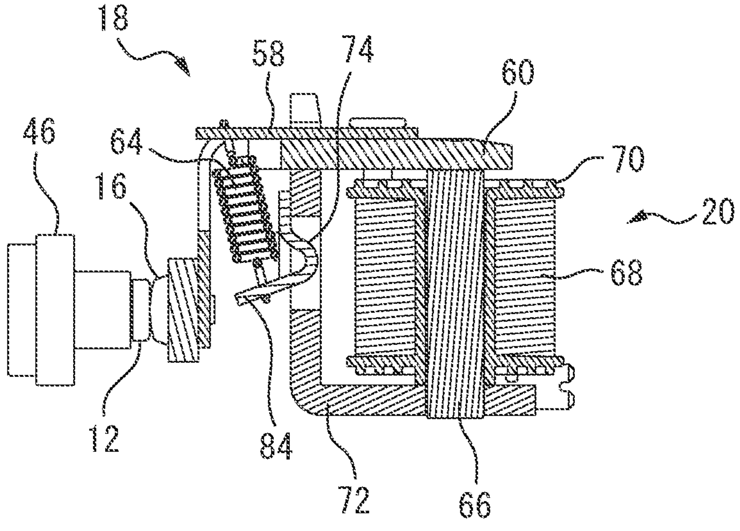
FIG. 17 is a side sectional view of the movable contact part and the electromagnet when the contacts are closed.

FIG. 14 is a side sectional view of the main body 21, FIGS. 15 and 16 are perspective views of examples of the post 74 and the movable spring 58, respectively. Although the return spring 64 in FIG. 14 is a coil spring, it may be formed by a leaf spring, etc. One end of the return spring 64 is engaged with and held by a recess 86 formed at a root of a front end 84 of the post 74 fixed to the yoke 72, the front end 84 being arranged at the center of the post 74 in the width direction thereof. The other end of the return spring 64 is engaged with and held in a recess 94 at a root of a protrusion 92 formed on the movable spring 58. When the electromagnet 20 is off, the urging force of the return spring 64 causes the armature 60 to tilt away from the iron core 66, and the movable contact 16 separates from the fixed contact 12. On the other hand, as shown in FIG. 17, when the electromagnet 20 is on, the armature 60 is displaced toward the iron core 66 by the magnetic force against the urging force of the return spring 64, and the movable contact 16 comes into contact with the fixed contact 12.

When a strong impact and/or external force is applied to the relay 10 in the contact/separation direction of the movable contact 16 (the left-right direction in FIG. 14), the movable contact 16 and the conductive plate 56 are largely displaced toward the yoke 72, whereby the movable spring 58 may be plastically deformed. In the embodiment, this problem can be prevented by extending the front end 84 closer to the movable contact than the yoke 72 with respect to the contact/separation direction of the contacts. Even if the movable contact 16 is displaced toward the yoke 72 due to the impact, etc., the movable spring 58 or the conductive plate 56 abuts on the front end 84 to limit further displacement of the movable spring 58, whereby damage or plastic deformation of the movable spring 58 can be prevented. Since the front end 84 is provided on the post to which the return spring is attached, it is not necessary to provide a separate member for limiting the displacement of the movable spring, and thus the number of components can be reduced.

When one end of the return spring is directly engaged with the yoke 72, no member intervenes between the conductive plate and the yoke, and thus it is not possible to prevent the conductive plate from being largely displaced toward the yoke. Since the post 74 according to the embodiment has the front end 84 which holds the return spring 64 and limits the displacement of the conductive plate 56 in the left-right direction, plastic deformation, etc., of the movable spring 58 due to a large external force is prevented.

When downsizing of the relay is required, it is preferable that the distance between the yoke 72 and the conductive plate 56 be short. In the embodiment, as shown in FIG. 9 or 14, a recess or opening 96 is formed in the yoke 72 so that a portion of the post 74 is positioned in the opening 96. As shown in FIG. 15, the post 74 has a base portion 87 fixed to the yoke 72, a first bent portion 88 which bends in a direction extending from the base portion 87 into the opening 96, and a second bent portion 90 extending from the first bent portion 88 which bends in a direction opposite to the bending direction of the first bent portion 88. The front end 84 is provided to the second bent portion 90. By positioning the portion of the post 74 in the opening 96, the extending distance of the post 74 from the yoke 72 to the movable contact 16 can be minimized, whereby the relay can be downsized. Since the post 74 has two bent portions 88 and 90 which bend in the opposite directions, the post 74 can be elastically deformed in the contact/separation direction of the contacts, whereby damage or plastic deformation of the post 74 is prevented.

When a vibration with a frequency equal to the natural frequency of the moving part is applied to the relay, resonance of the moving part may occur. For example, when a vibration with a frequency equal to the natural frequency of the movable contact portion 18 is applied to the relay 10, the movable contact 16 and the fixed contact 12 resonate in the contact/separation direction, whereby and the movable contact 16 may unintentionally come into contact with the fixed contact 12. In such a case, there is a risk of malfunction of the relay 10.

In the embodiment, when the relay 10 is not operated and the movable contact 16 is in the neutral position as shown in FIG. 14, a distance d1 between the front end 84 and the movable spring 58 or the conductive plate 56 in the contact/separation direction of the contacts is set to be smaller than a distance d2 between the fixed contact 12 and the movable contact 16. Since d1 is smaller than d2, even if the movable contact part 18 vibrates due to resonance, the movable spring comes into contact with the post before the amplitude of the vibration becomes large, and thus the amplitude does not become larger any more. Therefore, it is possible to prevent the fixed contact 12 and the movable contact 16 from unintentionally contacting each other due to resonance. By virtue of the post 74 having the above-mentioned dimensional relationship, malfunction of the relay during the moving part resonates can be avoided.

In particular, in a DC relay to which a high voltage such as 400 to 800 V is applied, a member for extending or extinguishing an arc, specifically a permanent magnet or an arc extinguishing plate, is provided in order to protect the contacts. Since these members are attached to a component other than an arc-extinguishing chamber, etc., having an arc-extinguishing function, such members may increase costs and assembly man-hours of parts.

Figure 18:
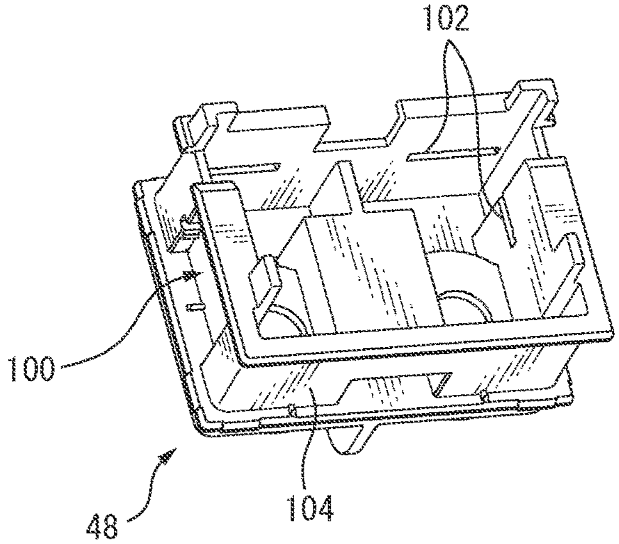
FIG. 18 is a perspective view of a base.

In the embodiment, as shown in FIGS. 8 and 18, the base 48 is formed into a frame shape or a box shape by resin molding, etc. The base 48 has a recess 100 into which the permanent magnet 50 is fitted, a slot 102 into which the arc extinguishing plate 52 is inserted, and an outer surface 104 to which the yoke 54 is attached. The base 48 shown in FIG. 8, etc., is integrally formed.

Figure 19:
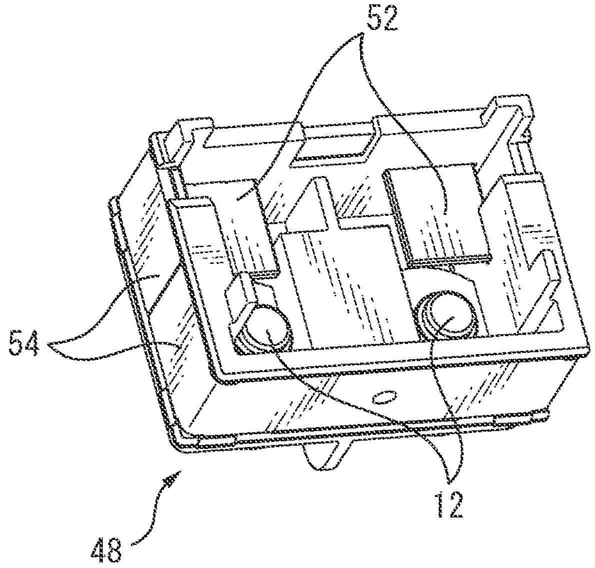
FIG. 19 shows the base to which a permanent magnet and an arc-extinguishing plate are attached.
Figure 20:
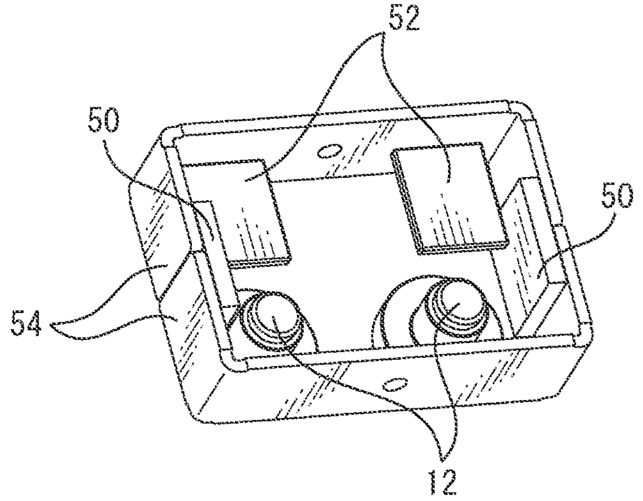
FIG. 20 shows a state in which the base is removed from FIG. 19.

FIG. 19 shows a state in which the permanent magnet 50 (FIG. 20), the arc-extinguishing plate 52 and the yoke 54 are attached to the base 48, and FIG. 20 shows a state in which the base 48 is removed from FIG. 19 for clarification. As shown in FIG. 19, the yoke 54, the permanent magnet 50 and the arc-extinguishing plate 52 can be attached to the base 48 to which the fixed contact 12 is attached. The base 48 also functions as an arc-extinguishing chamber having high arc-blocking property, including the permanent magnet 50 surrounding the fixed contact 12, the yoke 54 and the arc-extinguishing plate 52.

Figure 21:
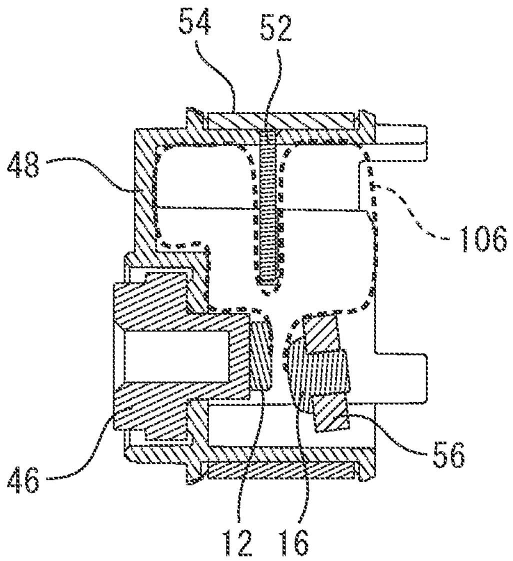
FIG. 21 shows a state in which an arc is extended by the arc-extinguishing plate.

FIG. 21 is a side sectional view of the base 48, showing how the arc is elongated and extinguished by the permanent magnet 50, the arc-extinguishing plate 52 and the yoke 54. The arc 106 generated between the fixed contact 12 and the movable contact 16 is elongated to the arc-extinguishing chamber within the base 48 by the magnetic flux from the permanent magnet 50 and the yoke 54. It is preferable that the surfaces of the two permanent magnets 50 facing each other have the same poles, and such a homopolar facing arrangement can elongate the arcs generated between each contact in the same direction.

Figure 22:
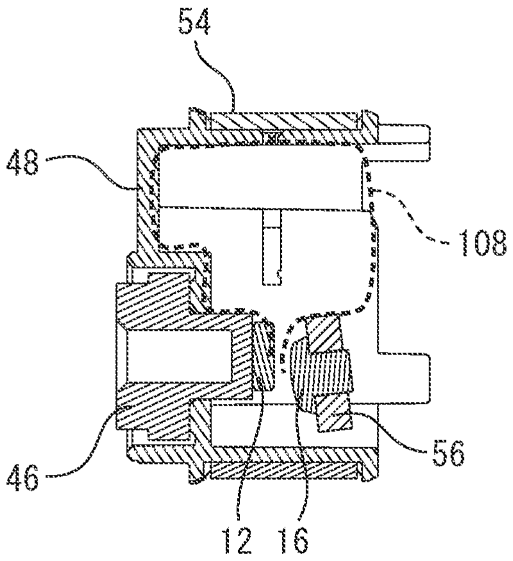
FIG. 22 shows a comparative example having no arc-extinguishing plate.

FIG. 22 shows a state of an arc in a comparative example in which the arc-extinguishing plate 52 is not provided. In FIG. 21, the arc 106 is elongated by the arc-extinguishing plate 52 inserted into the base 48. On the other hand, in FIG. 22 in which the arc-extinguishing plate 52 is not provided, the arc spreads in the base 48 without being elongated. In FIG. 21, by attaching all of the members related to the arc-extinguishing function to the base 48 in which a space for extinguishing the arc is secured, the relay having a high arc-blocking property is provided without increasing the number of parts.

The embodiment is a so-called double-break type relay, and the fixed contact 12 is attached to the base 48. Therefore, it is preferable to arrange the permanent magnet and/or the arc-extinguishing plate at a position close to each fixed contact. In the embodiment, the two permanent magnets 50 are attached to both sides of the base 48, and the two arc-extinguishing plates 52 are positioned on the base 48 so as to extend to the immediate vicinity of the respective fixed contacts 12. The yoke 54 is configured to be vertically divided into two parts and mounted from the vertical direction of the base 48 from the viewpoint of ease of assembly. However, the present disclosure is not limited as such, for example, the base may be horizontally divided into two parts, and mounted from the left-right direction of the base 48.

Figure 23:
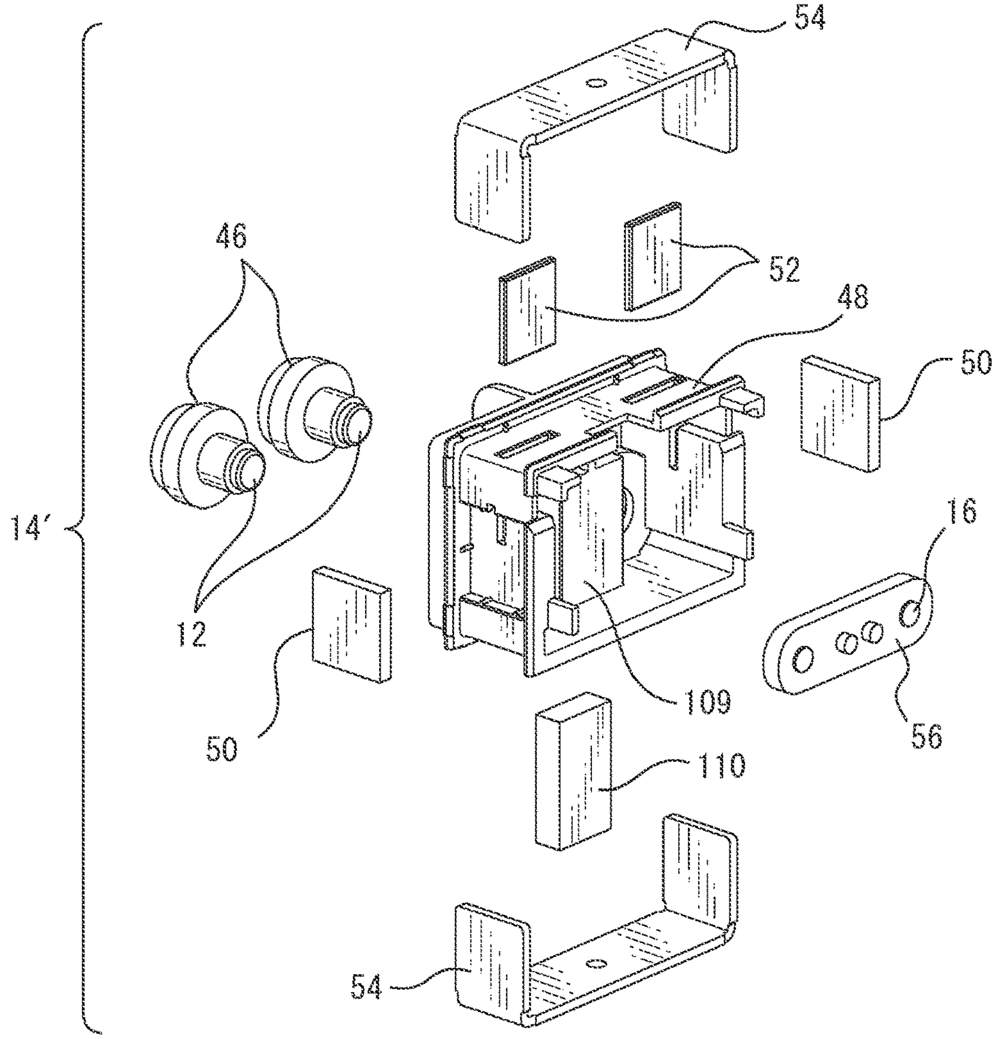
FIG. 23 is an exploded perspective view of a fixed contact part to which a magnetic shield is provided.

FIG. 23 is an exploded perspective view of a fixed contact part 14'. In the fixed contact portion 14', a magnetic shield 110 made of a material having a high magnetic permeability, such as iron, is arranged between the two fixed contacts 12 on a pedestal 109 of the base 48. With respect to the other components similar to those in FIG. 8, the same reference numerals are added thereto, and the detailed explanation thereof will be omitted.

Figure 24:
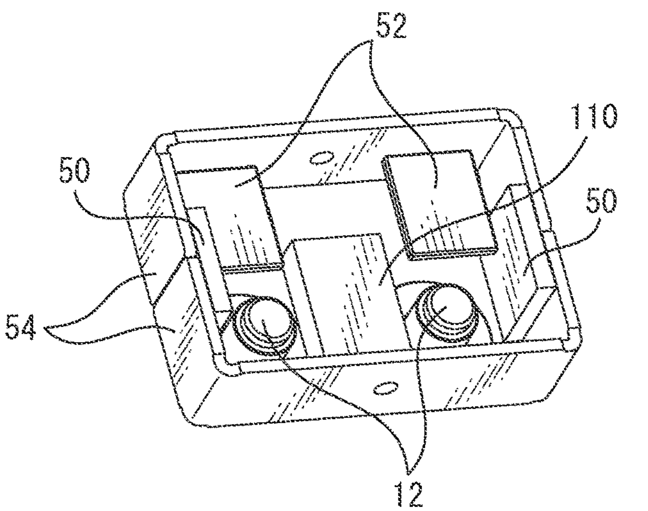
FIG. 24 shows a state in which the base is removed from FIG. 23.

FIG. 24 shows a state in which the base is removed from FIG. 23. FIG. 24 shows the permanent magnet 50, the arc-extinguishing plate 52, the yoke 54 and the magnetic shield 110. In the embodiment, in addition to the arc-extinguishing function, the magnetic flux absorbing function described below can also be obtained.

Figure 25:
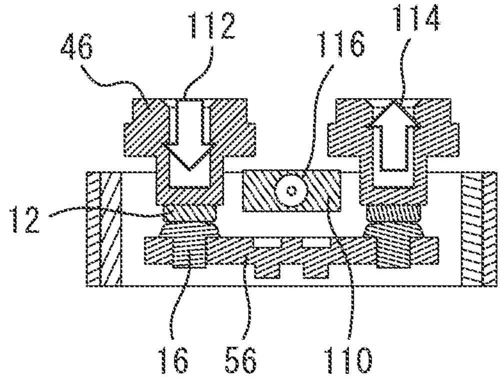
FIG. 25 is a view explaining a magnetic flux when the magnetic shield is provided.
Figure 26:
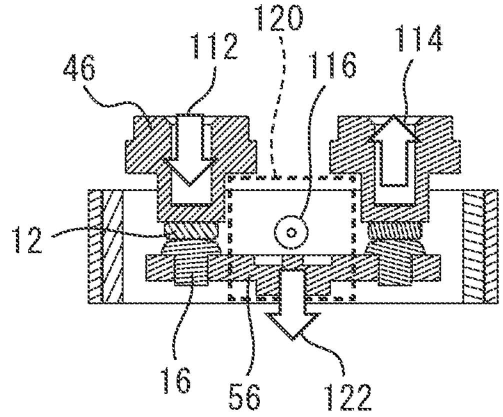
FIG. 26 shows a comparative example having no magnetic shield.

FIG. 25 is a diagram for explaining the relationship between the current flowing through the fixed contact 12 and the magnetic flux when the magnetic shield is provided, and FIG. 26 shows the relationship between the current and the magnetic flux in a comparative example in which the magnetic shield 110 is not provided. When a DC relay is used, for example, the current, input to one of the fixed terminals 46 in the direction of an arrow 112, passes through the fixed contact 12, the movable contact 16, the conductive plate 56 and the other fixed contact 12, and then flows out from the other of the fixed terminals 46 in the direction of an arrow 114. Due to the current flowing in this way, a magnetic flux 116 is generated between the two fixed contacts 12 and the two fixed terminals 46 in the direction perpendicular to the drawing sheet and from the back to the front. When a large current is applied to the closed contacts of the relay, an electromagnetic repulsive force is generated between the movable contact and the fixed contact, whereby the contacts may be separated or welded to each other.

As shown in FIG. 26, when the magnetic shield 110 is not provided, the influence of the magnetic flux 116 extends to the range indicated by a broken line 120, for example, so that the Lorentz force in the direction indicated by an arrow 122 acts on the conductive plate 56 within an area 120. In FIG. 26, a force in the contact opening direction is applied to the conductive plate 56, whereby the fixed contact 12 and the movable contact 16 may be separated from each other by the Lorentz force.

On the other hand, when the magnetic shield 110 is provided as shown in FIG. 25, the magnetic flux is absorbed by the magnetic shield 110, so that it is possible to prevent the conductive plate 56 from generating a force in the opening direction of the contacts due to the influence of the magnetic flux. Therefore, according to the embodiment, a relay which is unlikely to malfunction even when a large current is passed is provided.

The magnetic shield 110 is positioned not on the movable part of the relay 10 but on the fixed part such as the base 48. Although it is possible to locate the magnetic shield on the movable part, it is preferable to not locate the magnetic shield on the movable part, since malfunction tends to occur when an impact is applied to the relay having the relatively heavy movable part. In the embodiment, since the magnetic shield is positioned at the fixed part, the weight of the movable part is not increased by the magnetic shield, and such a defect can be prevented.

All examples and conditional language provided herein are intended for the purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A relay comprising:

an electromagnet having an iron core;

a movable contact part having a movable contact, configured to operate corresponding to an activation of the electromagnet;

a fixed contact part having a fixed contact positioned opposed to the movable contact; and a case configured to contain the electromagnet and the movable contact part, wherein the case has an opening on its side opened in a contact/separation direction between the fixed contact and the movable contact, and the fixed contact part constitutes a cover of the case, and wherein the case further comprises a first rib formed on an inner bottom surface of the case, extending to the opening side of the case, wherein the first rib contacts a lower surface of a yoke to support the movable contact part and contributes to a vertical positioning of the moveable contact part, and wherein the contact/separation is in a perpendicular direction to an axial direction of the iron core of the electromagnet.

2. A relay comprising:

an electromagnet having an iron core;

a movable contact part having a movable contact, configured to operate corresponding to an activation of the electromagnet;

a fixed contact part having a fixed contact positioned opposed to the movable contact; and a case configured to contain the electromagnet and the movable contact part, wherein the case has an opening on its side opened in a contact/separation direction between the fixed contact and the movable contact, and the fixed contact part constitutes a cover of the case, and wherein the case further comprises a second rib formed on an inner side surface of the case, extending to the opening side of the case, wherein the second rib contacts a side surface of a yoke to support the movable contact part, and contributes to positioning of the electromagnet relative to the case in a width direction, and wherein the contact/separation is in a perpendicular direction to an axial direction of the iron core of the electromagnet.

3. A hinge type relay comprising:

a fixed contact part including a fixed contact;

a main body comprising:

an electromagnet including a yoke; and a movable contact part having an armature swingably attached to the yoke, a movable spring attached to the armature, and a movable contact positioned opposed to the fixed contact, and the armature is configured to rotate corresponding to an activation of the electromagnet; and a case configured to contain the main body, wherein the case has a structure opened between the fixed contact and the movable contact, and the fixed contact part constitutes a cover of the case, and wherein the main body is inserted into the case in a contact/separation direction from lateral sides.

4. The hinge type relay according to claim 3, wherein the case further comprises a first rib formed on an inner bottom surface of the case, extending in the contact/separation direction from an opening side of the case, and supporting a lower surface of the main body.

5. The hinge type relay according to claim 3, wherein the case further comprises a second rib formed on an inner side surface of the case, extending in the contact/separation direction from an opening side of the case, and contacting a side surface of the main body.

* * * * *